United States Patent [19]

Shoji et al.

[11] Patent Number: 4,619,352
[45] Date of Patent: Oct. 28, 1986

[54] ONE-WAY CLUTCH

[75] Inventors: Masao Shoji, Fujisawa; Mikio Uchida, Yamato; Yoshio Kinoshita, Ayase, all of Japan

[73] Assignee: NSK-Warner K. K., Tokyo, Japan

[21] Appl. No.: 649,177

[22] Filed: Sep. 10, 1984

[30] Foreign Application Priority Data

Sep. 27, 1983 [JP] Japan .......................... 58-148131[U]

[51] Int. Cl.$^4$ ............................................ F16D 41/06
[52] U.S. Cl. ................................... 192/41 A; 192/45.1
[58] Field of Search ........................... 192/41 A, 45.1; 188/82.8

[56] References Cited

U.S. PATENT DOCUMENTS

| | | | |
|---|---|---|---|
| 1,980,289 | 11/1934 | Osterholm | 192/41 A |
| 2,173,604 | 9/1939 | Dodge | 192/45.1 X |
| 2,832,450 | 4/1958 | Wade | 192/45.1 |
| 2,856,045 | 10/1958 | Ferris | 192/45.1 |
| 3,049,205 | 8/1962 | Ferris et al. | 192/45.1 |
| 3,388,779 | 6/1968 | Roper | 192/45.1 X |
| 3,532,198 | 10/1970 | Lederman | 192/45.1 |

Primary Examiner—Rodney H. Bonck
Assistant Examiner—Richard M. Lorence
Attorney, Agent, or Firm—Shapiro and Shapiro

[57] ABSTRACT

A one-way clutch device comprises a first member having an annular track surface, a second member having an annular track surface concentric with the annular track surface of the first member, a ring space defined between the track surface of the first member and the track surface of the second member, torque transmitting members disposed in the ring space and tiltable into wedge engagement with both of the track surfaces to connect the track surfaces together for rotation in unison, a first annular retaining member engaged with the torque transmitting members to hold the same, the first retaining member being disposed concentrically with and adjacent to the track surface of the first member and engaged with the first member to prevent axial slippage thereof, a second annular retaining member engaged with the torque transmitting members to hold the same, the second retaining member being disposed concentrically with and adjacent to the track surface of the second member, and a spring interposed between the first retaining member and the second retaining member and biasing the two retaining members away from each other.

7 Claims, 5 Drawing Figures

PRIOR ART FIG. 1
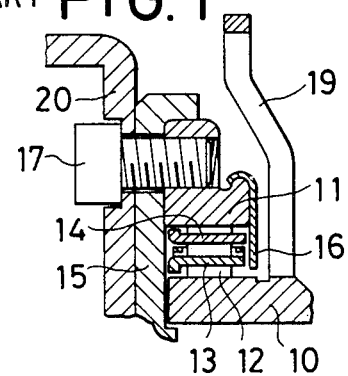
FIG. 2
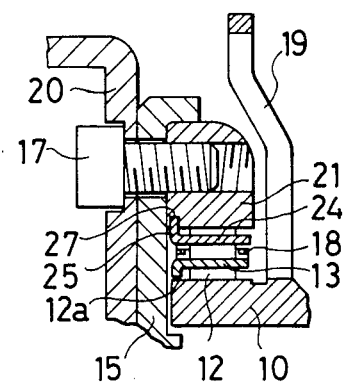
FIG. 3
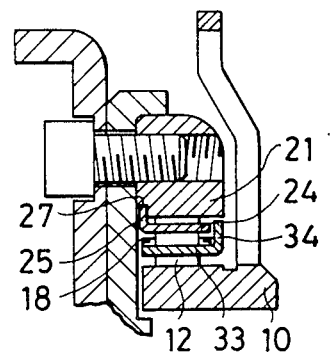

ONE-WAY CLUTCH

BACKGROUND OF THE INVENTION

1. Field of the Invention

This invention generally relates to a one-way clutch having an inner race, an outer race and a torque transmitting wedge member supported and contained between the two races by a retainer, and more particularly to a one-way clutch which is improved in respect of the prevention of slippage of the retainer in an axial direction.

2. Description of the Prior Art

FIG. 1 depicts the structure of a prior one-way clutch, including concentric inner and outer retainers 13 and 14 supporting a wedge member 12 contained between an inner race 10 and an outer race 11 which are concentric with the retainers. In order to prevent axial slippage (leftward and rightward as viewed in FIG. 1) of the retainers, plates 15 and 16 are secured to the sides of outer race 11, as shown.

However, in such construction, the desirable objectives of reduction in number of parts, reduction in axial dimension, lightening of the weight and reduction in cost are hampered by the presence of the pair of plates for preventing slippage.

SUMMARY OF THE INVENTION

It is therefore an object of the present invention to provide a one-way clutch in which the slippage of a retainer in at least one axial direction is prevented by the engagement between the retainer and the inner race or the outer race, whereby at least one of the plates can be eliminated.

The invention will become fully apparent from the following detailed description thereof taken in conjunction with the accompanying drawings.

BRIEF DESCRIPTION OF THE DRAWINGS

FIG. 1 illustrates an example of the prior art.

FIG. 2 illustrates a first embodiment of the present invention.

FIG. 3 illustrates a modification of the first embodiment.

DESCRIPTION OF THE PREFERRED EMBODIMENTS

Figure 4:
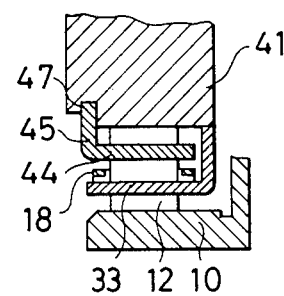
FIG. 4 illustrates a second embodiment of the present invention.

Some embodiments of the present invention will hereinafter be described by reference to the drawings.

FIG. 2 shows a first embodiment of the present invention. In this embodiment, the left end of an outer retainer 24 has a flange portion 25 which is a radially outwardly extending retaining portion. This flange portion 25 is set so as to extend into a stepped groove 27 provided in the left end surface of the track of an outer race 21 and extending circumferentially. The left side of the stepped groove 27 is closed by a plate 15 fixed to the outer race 21 by means of a bolt 17, whereby the flange portion 25, and thus the outer retainer 24, is fixed to the end surface of the outer race.

Consequently, in the present embodiment, the slippage of the outer retainer 24 in the right axial direction is prevented by the engagement of the flange portion 25 with the groove 27 and therefore, it is not necessary to provide a plate 16 as shown in FIG. 1 on the right side.

A ribbon spring 18 is provided between the inner and outer retainers 13 and 24 for biasing the retainers away from each other and biasing a wedge member 12. A member 19 secured to the inner race 10 and a member 20 fixed to the outer race 21 by a bolt 17 are members such as gears for transmitting the movement of the inner race 10 and outer race 21 to other parts.

A modification of the first embodiment will now be described by reference to FIG. 3.

In this modification, a flange portion 34 at the right end of an inner retainer 33 is set on the outer race track surface side. This construction offers certain advantages over that of FIG. 2 when the one-way clutch is used in the state of overrun (high-speed rotation of the outer race), under violent vibrating conditions, or an almost non-lubricated state. In particular, if the inner retainer 13 has a shape as shown in FIG. 2, there is an undesirable possibility of abrasion of the inner wall surface 12a (FIG. 2) of the flange portion of the inner retainer, which serves to guide the inner race side of the retainer relative to the inner race track surface. This possibility is eliminated by locating the flange portion 34 of the inner retainer 33 on the outer diameter side of that retainer as shown in FIG. 3, to thereby completely space the inner retainer 33 apart from the inner race track surface.

Figure 5:
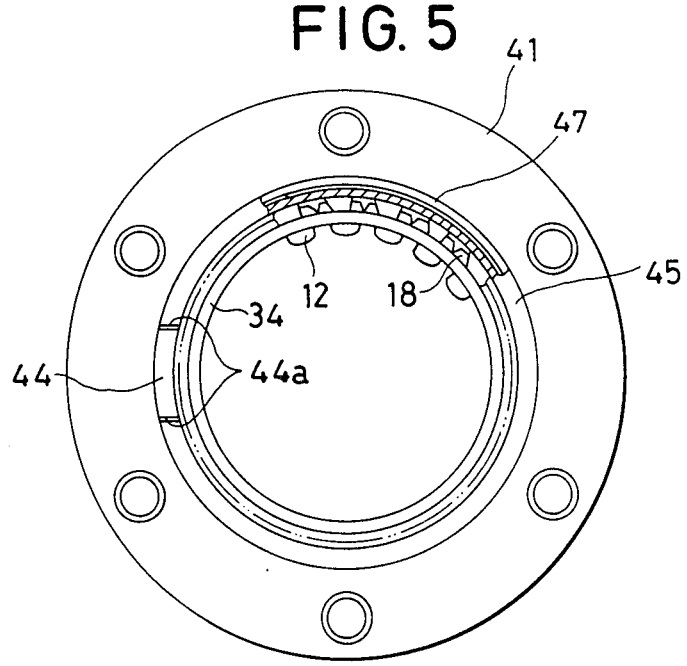
FIG. 5 is a partly broken-away front view of the second embodiment.

A second embodiment of the present invention will now be described by reference to FIGS. 4 and 5.

Usually, to fix the outer retainer to the outer race and quickly transmit the movement of the outer race to a wedge member through the outer retainer, a drag clip is used or a slit 44a (see FIG. 5) is formed in the outer retainer and a radially outwardly bent portion is provided. In the latter form the retainer is set by being fitted into engagement with the outer race while the bent portion is pressed inwardly. The present embodiment is one which uses the latter outer retainer.

In the present embodiment, a flange portion 45 extending radially outwardly of the outer retainer 44, as described above, is disposed so as to extend into a two-step groove 47 formed in the outer race 41 so that the retainer 44 does not slip out in the left and right axial directions even if the opposite plates 15 and 16 shown in FIG. 1 are eliminated.

The above-described embodiments are only illustrative and the present invention is applicable even if a retainer of dual structure is not required and the engaging portion such as a groove or the like is in some other form.

According to the present invention, as described above, axial slippage of the retainer is prevented by the engagement thereof with the inner race or the outer race and therefore, there is realized a one-way clutch in which members such as slippage preventing plates are eliminated or reduced in number and which is remarkably improved in respect of dimensions, weight, cost, etc.

We claim:

1. A one-way clutch device comprising:
   an inner race;
   an outer race disposed radially outside of said inner race and concentric with said inner race;
   wedge means tiltably disposed between said inner and outer races for transmitting a torque from one of said races to the other, said wedge means wedge-engaging said races when tilted to connect both races for rotation in unison;

inner and outer retainers concentric with said races for retaining said wedge means between said races and facing said inner and outer races, respectively; and spring means interposed between said retainers for urging said wedge means toward wedge engagement with said races;

one of said retainers having a radially projecting flange portion extending into a groove provided on the corresponding facing race to engage said race and prevent said one retainer from tilting and moving in an axial direction.

2. A device according to claim 1, wherein the other of said retainers has an end flange which extends toward said corresponding facing race engaged with said one retainer.

3. A device according to claim 2, wherein said end flange extends into contact with said corresponding facing race engaged with said one retainer.

4. A one-way clutch device comprising:

an inner race;

an outer race disposed concentrically about said inner race;

torque transmitting means disposed between said inner and outer races and tiltable into wedge engagement with said inner and outer races for connecting the races together for one-way rotation in unison;

inner and outer annular retainers disposed between and concentric with said inner and outer races and retainably engaging said torque transmitting means; and spring means disposed between said retainers for urging said torque transmitting means toward wedge engagement with said races;

at least one of said retainers and one of said races having mutually cooperable means for engaging said one retainer with said one race to prevent axial slippage of said one retainer relative to said one race.

5. A device according to claim 4, wherein said cooperable means comprises a groove in said one race and a portion of said one retainer extending into said groove.

6. A device according to claim 5, wherein said portion of said one retainer includes a flange portion at one end of said one retainer.

7. A device according to claim 6, wherein the other of said retainers has a flange at an end opposite said one end of said one retainer, said flange extending toward said one race.

* * * * *